(12) United States Patent
Lee

(10) Patent No.: US 12,298,820 B2
(45) Date of Patent: May 13, 2025

(54) ELECTRONIC DEVICE COMPRISING PLURALITY OF ELECTRIC OBJECTS

(71) Applicant: Samsung Electronics Co., Ltd., Suwon-si (KR)

(72) Inventor: Dongseop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 18/311,624

(22) Filed: May 3, 2023

(65) Prior Publication Data

US 2023/0273650 A1     Aug. 31, 2023

Related U.S. Application Data

(63) Continuation of application No. PCT/KR2021/015397, filed on Oct. 29, 2021.

(30) Foreign Application Priority Data

Nov. 6, 2020   (KR) .................. 10-2020-0148089

(51) Int. Cl.
G06F 1/16       (2006.01)

(52) U.S. Cl.
CPC .......... *G06F 1/1683* (2013.01); *G06F 1/1643* (2013.01); *G06F 1/1684* (2013.01)

(58) Field of Classification Search
CPC .............................. G06F 1/1637; G06F 1/1643
See application file for complete search history.

(56) References Cited

U.S. PATENT DOCUMENTS

| | | | |
|---|---|---|---|
| 5,529,863 | A | 6/1996 | Swirbel et al. |
| 6,670,706 | B2 | 12/2003 | Ikegami |
| 2004/0174869 | A1 | 9/2004 | Sone et al. |
| 2018/0173277 | A1 | 6/2018 | Lee |
| 2020/0301535 | A1 | 9/2020 | Choi et al. |
| 2021/0255514 | A1 | 8/2021 | Koide et al. |

FOREIGN PATENT DOCUMENTS

| | | |
|---|---|---|
| JP | 8-8298 A | 1/1996 |
| JP | 10-303525 A | 11/1998 |
| JP | 2003-283069 A | 10/2003 |
| JP | 2004-165288 A | 6/2004 |
| JP | 2004-260624 A | 9/2004 |

(Continued)

OTHER PUBLICATIONS

International Search Report dated Feb. 18, 2022, issued in International Patent Application No. PCT/KR2021/015397.

(Continued)

*Primary Examiner* — Adrian S Wilson
(74) *Attorney, Agent, or Firm* — Jefferson IP Law, LLP

(57) ABSTRACT

An electronic device is provided. The electronic device includes a first electric object including a first wiring extending in a first direction and a second wiring including a first portion extending in the first direction and a second portion extending in a second direction different from the first direction, and including an opening in one region, and a second electric object including a third wiring extending in the first direction and a fourth wiring including a third portion extending in the first direction and a fourth portion extending in the second direction, wherein the second electric object is coupled to the first electric object so as to finish at least a portion of the opening.

19 Claims, 11 Drawing Sheets

(56) References Cited

FOREIGN PATENT DOCUMENTS

| | | |
|---|---|---|
| JP | 2006-13544 A | 1/2006 |
| JP | 2009-277873 A | 11/2009 |
| JP | 7085915 B2 | 6/2022 |
| KR | 10-2009-0083238 A | 8/2009 |
| KR | 10-2017-0091383 A | 8/2017 |
| KR | 10-2018-0070309 A | 6/2018 |
| KR | 10-2020-0113065 A | 10/2020 |

OTHER PUBLICATIONS

Korean Notice of Patent Grant dated Mar. 17, 2025, issued in Korean Application No. 10-2020-0148089.

ELECTRONIC DEVICE COMPRISING PLURALITY OF ELECTRIC OBJECTS

CROSS-REFERENCE TO RELATED APPLICATION(S)

This application is a continuation application, claiming priority under § 365(c), of an International application No. PCT/KR2021/015397, filed on Oct. 29, 2021, which is based on and claims the benefit of a Korean patent application number 10-2020-0148089, filed on Nov. 6, 2020, in the Korean Intellectual Property Office, the disclosure of which is incorporated by reference herein in its entirety.

BACKGROUND

1. Field

The disclosed relates to an electronic device including a plurality of electric objects.

2. Description of Related Art

Sensors disposed on a front surface of electronic devices or exposed through the front surface may be disposed under displays so as not to limit screen expansion of the displays. In such a case, some electric objects overlapping sensors under displays may be separated into a plurality of parts in connection with securing areas in which the sensors are to be disposed. For example, electric objects may be separated into a first electric object including an opening such that a sensor may be disposed therein, and a second electric object resulting from the opening.

The above information is presented as background information only to assist with an understanding of the disclosure. No determination has been made, and no assertion is made, as to whether any of the above might be applicable as prior art with regard to the disclosure.

SUMMARY

The first electric object and the second electric object, which have been separated, may be coupled to implement the target function intended by the electric objects. For example, the second electric object may be disposed to at least partially overlap the opening of the first electric object in which a sensor is disposed, and the first electric object and the second electric object may be electrically connected in various types of coupling.

However, when each of the first electric object and the second electric object includes a plurality of wires extending in multiple directions in connection with implementation of functions of the electric objects, an align deviation may occur with regard to the plurality of wires during a process in which the first electric object and the second electric object are coupled. Such an align deviation may degrade the efficiency of the process in which the first electric object and the second electric object are coupled, or may degrade the functional reliability of the coupled electric objects.

Aspects of the disclosure are to address at least the above-mentioned problems and/or disadvantages and to provide at least the advantages described below. Accordingly, an aspect of the disclosure is to provide an electronic device including a plurality of electric objects designed such that, at a boundary portion between a first electric object and a second electric object, a plurality of wires included in each of the first electric object and the second electric object extend in an identical direction.

Additional aspects will be set forth in part in the description which follows and, in part, will be apparent from the description, or may be learned by practice of the presented embodiments.

In accordance with an aspect of the disclosure, an electronic device is provided. The electronic device includes a first electric object including a first wire extending in a first direction, a second wire including a first portion extending in the first direction and a second portion extending in a second direction different from the first direction, and an opening in one region, and a second electric object including a third wire extending in the first direction and a fourth wire including a third portion extending in the first direction and a fourth portion extending in the second direction, wherein the second electric object is coupled to the first electric object so as to close at least a portion of the opening.

According to an embodiment, the first wire of the first electric object and the third wire of the second electric object may be electrically connected and extend in the first direction.

According to an embodiment, the first portion of the second wire of the first electric object and the third portion of the fourth wire of the second electric object may be electrically connected and extend in the first direction.

In accordance with another aspect of the disclosure, the electronic device is provided. The electronic device includes a display, a first digitizer disposed on the lower part of the display and including an opening in one region, a sensor disposed inside the opening at the lower part of the display, and a second digitizer coupled to the first digitizer so as to close at least a portion of the opening at the lower part of the display.

In accordance with another aspect of the disclosure, the first digitizer is provided. The first digitizer includes a first wire extending in a first direction and a second wire including a first portion extending in the first direction and a second portion extending in the second direction different from the first direction.

In accordance with another aspect of the disclosure, the second digitizer is provided. The second digitizer includes a third wire extending in the first direction and a fourth wire including a third portion extending in the first direction and the fourth portion extending in the second direction.

According to an embodiment, the first wire of the first digitizer and the third wire of the second digitizer are electrically connected and extend in the first direction.

According to an embodiment, the first portion of the second wire of the first digitizer and the third portion of the fourth wire of the second digitizer are electrically connected and extend in the first direction.

According to various embodiments, during a process in which a first electric object and a second electric object are coupled, the occurrence of an align deviation related to a plurality of wires included in each of the first electric object and the second electric object may be improved.

According to various embodiments, by improving the align deviation related to the plurality of wires, the efficiency of the process in which the first electric object and the second electric object are coupled may be improved.

According to various embodiments, the functional reliability of electric objects obtained by coupling the first electric object and the second electric object may be improved.

Other aspects, advantageous, and salient features of the disclosure will become apparent be those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
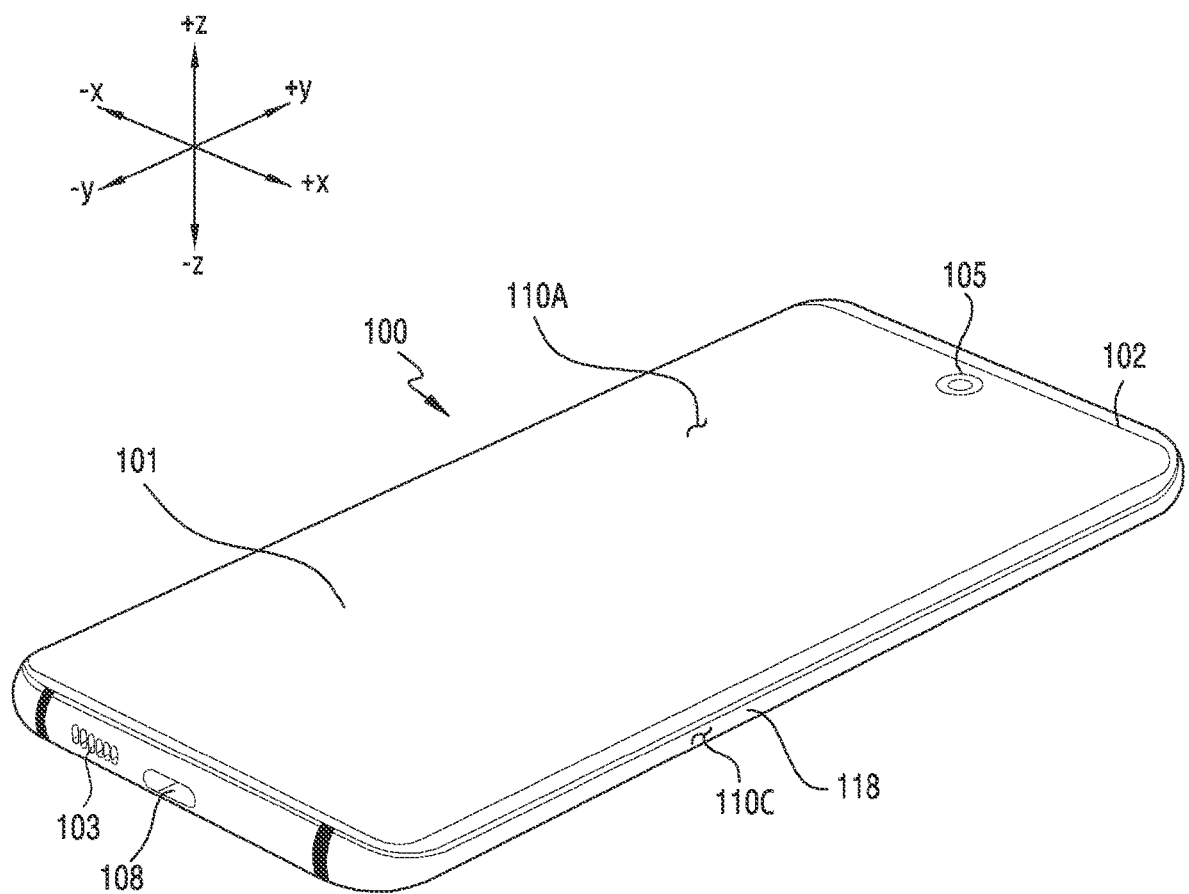
FIG. 1 is a view illustrating a front surface of an electronic device according to an embodiment of the disclosure.
Figure 2:
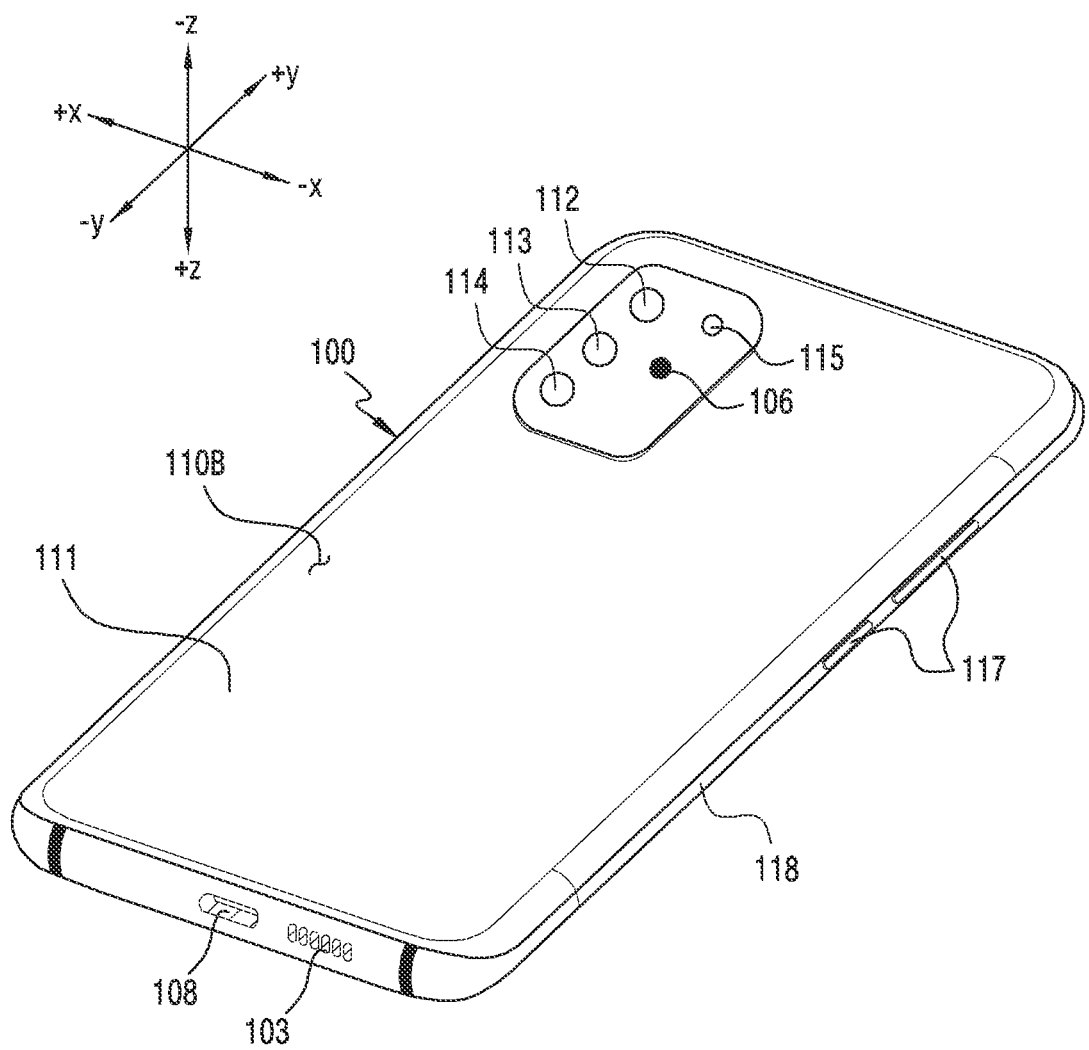
FIG. 2 is a view illustrating a rear surface of an electronic device according to an embodiment of the disclosure.
Figure 3:
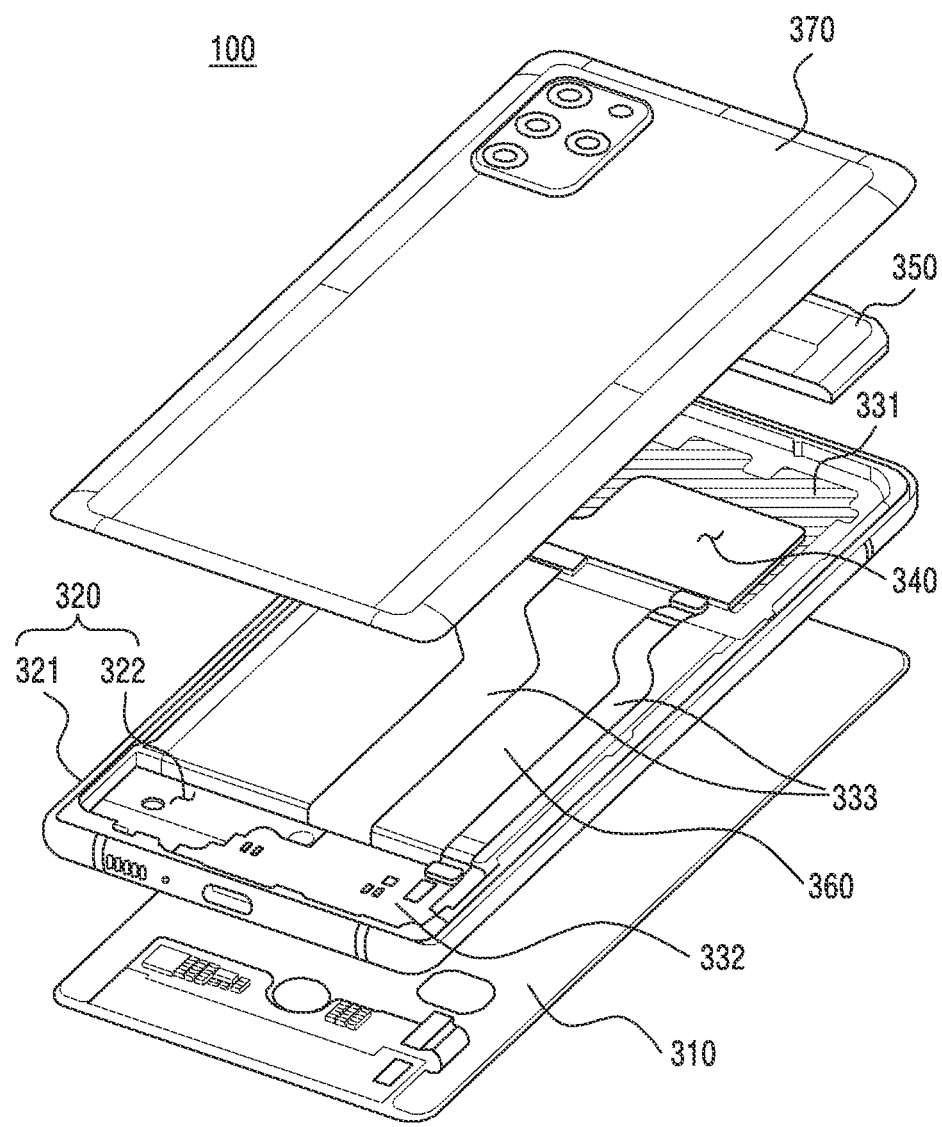
FIG. 3 is a view illustrating a developed state of an electronic device according to an embodiment of the disclosure.

Referring to FIGS. 1, 2, and 3, an electronic device to which a plurality of electric objects according to various embodiments may be applied may be described.

FIG. 1 is a view illustrating a front surface of an electronic device according to an embodiment of the disclosure. FIG. 2 is a view illustrating a rear surface of an electronic device according to an embodiment of the disclosure.

Referring to FIGS. 1 and 2, an electronic device 100 according to an embodiment may include a housing configured by a first surface 110A (or a front surface) oriented in the +Z direction, a second surface 110B (or a rear surface) oriented in the −Z direction opposite the +Z direction, and a third surface 110C (or a lateral surface) oriented in at least one direction among the +X direction, the −X direction, the +Y direction, and the −Y direction perpendicular to the +Z direction or the −Z direction and surrounding a space between a first surface 110A and a second surface 110B. In various embodiments, the housing may refer to a structure configuring a part of a first surface 110A, a second surface 110B, and a third surface 110C.

In an embodiment, the first surface 110A may be configured by a front surface plate 102 (e.g., a glass plate including various coating layers or a polymer plate), at least a part of which is substantially transparent. In some embodiments, the front surface plate 102 may include a curved surface portion bent and seamlessly extending from the first surface 110A toward a rear surface plate 111 configuring the second surface 110B, on at least one side edge portion.

In another embodiment, the second surface 110B may be configured by the rear surface plate 111 which is substantially opaque. In an example, the rear surface plate 111 may include coated or colored glass, ceramic, a polymer, a metal (e.g., aluminum, stainless steel, or magnesium), or a combination of at least two materials thereof. In some embodiments, the rear surface plate 111 may include a curved surface portion bent and seamlessly extending from the second surface 110B toward the front surface plate 102 configuring the first surface 110A, on at least one side edge portion.

In yet another embodiment, the third surface 110C may be configured by a lateral surface member 118 (or a bracket) coupled to the front surface plate 102 and the rear surface plate 111. In various embodiments, the lateral surface member 118 may include at least one of a metal and a polymer. In other embodiments, the rear surface plate 111 and the lateral surface member 118 may be integrally configured and include the same material (e.g., a metal material such as aluminum).

In still another embodiment, the electronic device 100 may include at least one of a display 101, an audio module 103, at least one camera module (at least one of the camera modules 105, 112, 113, 114, and 115), a flash 106, a key input device 117, and a connector hole 108. In some embodiments, the electronic device 100 may not include at least one of the described components (e.g., the key input device 117) or may additionally include another component. The electronic device 100 may additionally include a sensor module, and the sensor module may include at least one of an optical sensor, an ultrasonic sensor, and a capacitive sensor. In one embodiment, the sensor module may be disposed on at least one of the lower part of a screen display area of the display 101 (e.g., the display 101 area viewed through the front surface plate 102) and a surrounding area of the display 101. In various embodiments, the electronic device 100 may further include a light emitting device, and the light emitting device may be disposed adjacent to the display 101 within an area provided by the front surface plate 102. In another embodiment, the light emitting device may provide, for example, state information of the electronic device 100 in an optical type. In yet another embodiment, the light emitting device may provide a light source interworking with an operation of the first camera module 105. In various embodiments, the light emitting device may include at least one of a light-emitting diode (LED), an infrared (IR) LED, and a xenon lamp.

The display 101 may be seen from the outside of the electronic device 100 through the majority part of the front surface plate 102. In some embodiments, the edge of the display 101 may be configured to be substantially equal to the outer periphery shape (e.g., a curved surface) of the adjacent front surface plate 102. In other embodiments, in order to expand an area where the display 101 is visually exposed, the display 101 may be configured to have a substantially uniform spacing between the outer periphery of the display and the outer periphery of the front surface plate 102. In still other embodiments, a recess, a notch, or an opening may be configured at a part of the screen display area of the display 101, and the electronic device 100 may include electronic components arranged with the recess, the notch, or the opening, for example, the first camera module 105, a proximity sensor, or an illuminance sensor.

In an embodiment, the electronic device 100 may include at least one camera module (at least one of the camera modules 105, 112, 113, 114, and 115) disposed at the lower part of the screen display area of the display 101, the fingerprint sensor, and the flash 106. In another embodiment, the display 101 may be coupled to or disposed adjacent to at least one of a touch detecting circuit, a pressure sensor capable of measuring strength (e.g., pressure) of a touch, and a digitizer of detecting a stylus pen of a magnetic field scheme.

According to one embodiment, the audio module 103 may include at least one of a microphone hole and a speaker hole. A microphone configured to obtain external sounds may be disposed inside the microphone hole and for example, a plurality of microphones may be disposed to detect a direction of a sound. In some embodiments, the microphone hole and the speaker hole may be implemented as one hole (e.g., the audio module 103) or a speaker (e.g., a piezo speaker) which does not have the speaker hole on the electronic device 100 may be included. In other embodiments, the speaker hole may include at least one among an external speaker hole and a call receiver hole.

According to another embodiment, the electronic device 100 may generate a data value or an electric signal corresponding to an internal operation state or an external environment state, by using the sensor module (not illustrated). According to yet another embodiment, the sensor module may include, for example, at least one of a proximity sensor disposed on the first surface 110A of the housing and a biometric sensor (e.g., a heart rate monitoring (HRM) sensor) disposed on the second surface 110B of the housing. In various embodiments, the sensor module may further include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, and the like.

In an embodiment, the first camera module 105 among the at least one camera module (at least one of the camera modules 105, 112, 113, 114, and 115) may be disposed on the first surface 110A of the electronic device 100, and the second camera module (at least one of the camera modules 112, 113, 114, and 115) and the flash 106 may be disposed on the second surface 110B of the electronic device 100. At least one camera module (at least one of the camera modules 105, 112, 113, 114, and 115) may include, for example, at least one of one or multiple lenses, an image sensor, and/or an image signal processor. In another embodiment, the multiple lenses (a wide-angle lens and a telephoto lens) and the image sensor may be disposed on one surface of the electronic device 100. The flash 106 may include, for example, a light emitting diode or a xenon lamp.

The key input device 117 may be disposed on the third surface 110C of the housing. In some embodiments, the electronic device 100 may not include all or a part of the key input device 117, and the key input device 117, which is not included therein, may be implemented to have the same shape as a soft key on the display 101. In an embodiment, the key input device 117 may include at least a part of the fingerprint sensor disposed on the second surface 110B of the housing.

In an embodiment, the connector hole 108 may accommodate at least one of a connector for transmitting/receiving at least one of power and data to/from an external electronic device and a connector for transmitting/receiving an audio signal to/from an external electronic device. In another embodiment, the connector hole 108 may accommodate at least one of a universal serial bus (USB) connector and an earphone jack. In yet another embodiment, the electronic device 100 may transmit/receive at least one of power and data to/from an external electronic device and transmit/receive an audio signal to/from an external electronic device, without the connector hole 108.

FIG. 3 is a view illustrating a developed state of an electronic device according to an embodiment of the disclosure.

Referring to FIG. 3, an electronic device 100 according to an embodiment may include at least one of a front surface plate (e.g., a front surface plate 102 of FIG. 1), a display 310 (e.g., a display 101 of FIG. 1), a lateral surface member 320 (e.g., a lateral surface member 118 of FIGS. 1 and 2), at least one printed circuit board 330, a first support structure 340 (e.g., a shield can), a second support structure 350, a battery 360, a rear surface plate 370 (e.g. a rear surface plate 111 of FIG. 2). At least one of components of the electronic device 100 illustrated in FIG. 3 may be the same component as or the similar component with the components described through FIGS. 1 and 2, and redundant explanations will be omitted below.

According to one embodiment, the lateral surface member 320 may include at least one of a metal frame structure 321 and a support member 322. In an embodiment, the metal frame structure 321 may be made of a conductive material (e.g., a metal) to configure a lateral surface (e.g., the third surface 110C of FIG. 1) of the electronic device 100. The metal frame structure 321 may include, for example, at least one conductive portion and at least one nonconductive portion which insulates the at least one conductive portion. According to another embodiment the at least one conductive portion may operate as an antenna radiator which transmits or receives an RF signal of a predetermined frequency band. In yet another embodiment, the support member 322 may be configured to include at least one of a metal material and a non-metal material (e.g., a polymer), and may provide a space where electronic components may be disposed in the electronic device 100. In an example, the display 310 may be disposed on one surface (e.g., one surface oriented in the +Z direction) of the support member 322, and the at least one printed circuit board 330 may be disposed on the other surface (e.g., one surface oriented in the −Z direction) of the support member 322. In some embodiments, the support member 322 may be connected to the metal frame structure 321 or integrally configured with the metal frame structure 321.

In one embodiment, a plurality of electronic components may be disposed on the at least one printed circuit board 330. At least one of a processor (e.g., a processor 1020 of FIG. 10), a memory (e.g., a memory 1030 of FIG. 10), and an interface (e.g., an interface 1077 of FIG. 10) may be disposed on the at least one printed circuit board 330. In another embodiment, the processor 1020 may include, for example, at least one of a central processing unit, an application processor, a graphics processing unit, an image signal processor, a sensor hub processor, and a communication processor. The memory 1030 may include, for example, at least one of a volatility memory and a non-volatility memory. In yet another embodiment, the interface 1077 may include, for example, at least one of a high definition multimedia interface (HDMI), a universal serial bus (USB) interface, a secure digital (SD) card interface, and an audio interface. In still another embodiment, the interface 1077 may enable the electronic device 100 to be electrically or physically connected to an external electronic device and include at least one of a USB connector, an SD card, a multimedia card (MMC) connector, and an audio connector.

According to one embodiment, the at least one printed circuit board 330 may include at least one of a first printed circuit board 331 and a second printed circuit board 332. In an embodiment, the first printed circuit board 331 may be disposed on one region (e.g., one region oriented in the +Y direction) of the support member 322, and the second printed circuit board 332 may be disposed on the other region (e.g., one region oriented in the −Y direction) of the support member 322 spaced apart from the first printed circuit board 331. In another embodiment, the first printed circuit board 331 and the second printed circuit board 332 may be electrically connected through an electrical connection member 333. In yet another embodiment, the electrical connection member 333 may include, for example, at least one of a flexible printed circuit board, a coaxial cable, a board to aboard (B to B) connector. A structure of the at least one printed circuit board 330 is not limited to the illustrated example, and the at least one printed circuit board 330 may be implemented as one printed circuit board in various embodiments.

In one embodiment, the first support structure 340 (e.g., a shield can) may be configured to include a conductive material (e.g., a metal), and disposed on the at least one printed circuit board 330. According to another embodiment, a patch antenna may be disposed on at least one region (e.g., one region oriented in the −Z direction) of the first support structure 340, and the first support structure 340 may support the patch antenna. The patch antenna may operate, for example, as an antenna radiator which transmits or receives an RF signal of an ultra-wide band.

The first support structure 340 may, for example, shield a plurality of electronic components arranged on the at least one printed circuit board 330. In an example, the first support structure 340 may be disposed to surround or to cover the plurality of electronic components, so as to block noise generated from the plurality of electronic components.

According to one embodiment, the second support structure 350 may be made of a material different from that of the first support structure 340. The second support structure 350 may be made of a non-conductive material (e.g., plastic), but it is not limited thereto. According to another embodiment, the second support structure 350 may be disposed on one region of the at least one printed circuit board 330 to prevent the plurality of electronic components disposed on the at least one printed circuit board 330 from being damaged by an external shock. According to yet another embodiment, the second support structure 350 may be disposed not to overlap the first support structure 340 when viewed from the upper part (e.g., the upper part oriented in the −Z direction) of the at least one printed circuit board 330. According to still another embodiment, the second support structure 350 may be disposed to overlap at least a part of the first support structure 340.

In an embodiment, the battery 360 may supply power to at least one component of the electronic device 100, and may include, for example, a non-rechargeable primary battery, a rechargeable secondary battery, or a fuel cell. In another embodiment, at least a part of the battery 360 may be disposed on the plane substantially identical to at least one printed circuit board 330. In some embodiments, the battery 360 may be integrally disposed in the electronic device 100, or disposed to be attachable to or detachable from the electronic device 100.

In yet another embodiment, the rear surface plate 370 may configure the rear surface (e.g., the second surface 110B of FIG. 2) of the electronic device 100. The rear surface plate 370 may, for example, be protected from the introduction of foreign matter or an external shock of the inner components of the electronic device 100.

Figure 4:
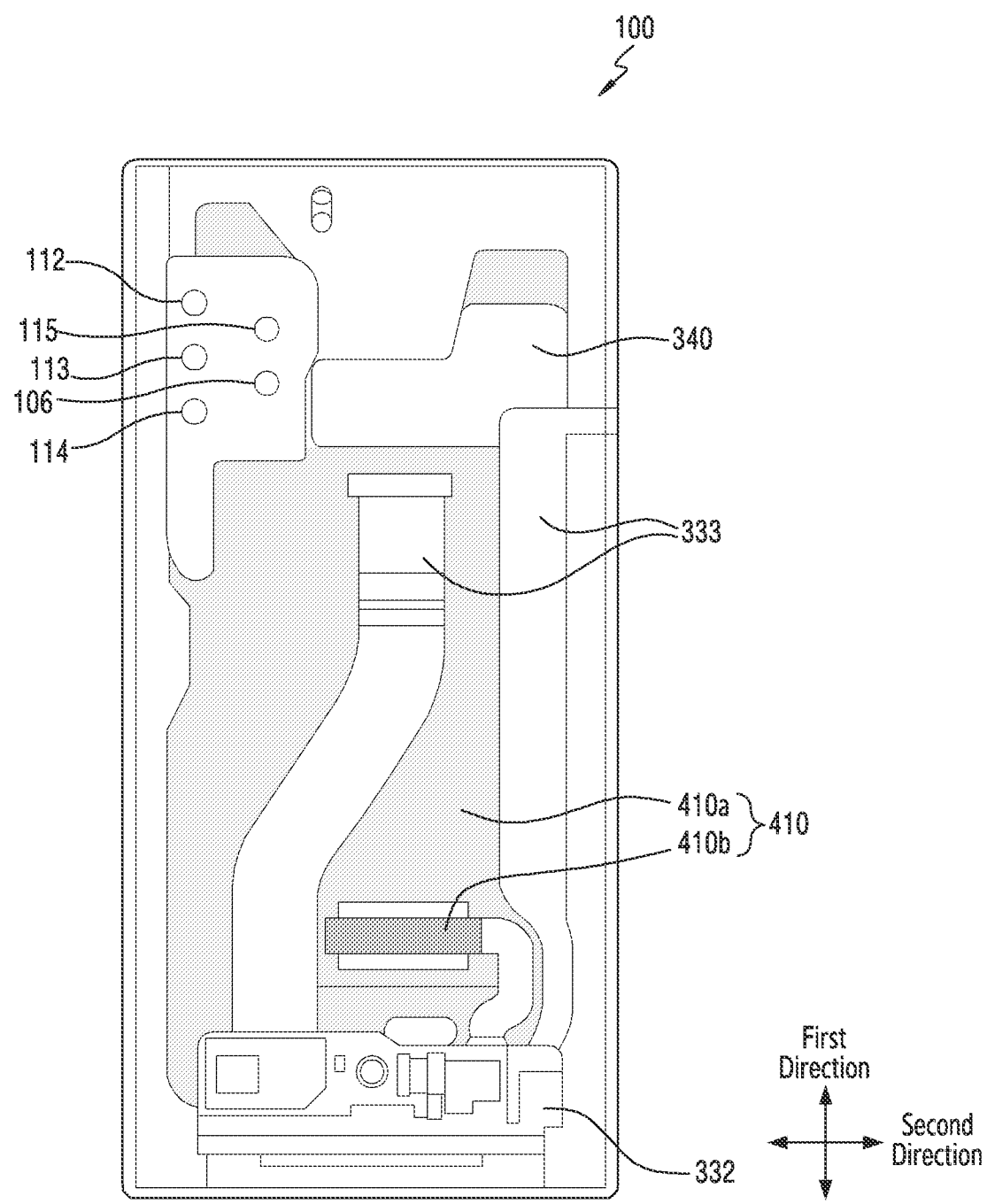
FIG. 4 is a view illustrating a disposition structure of a plurality of electric objects according to an embodiment of the disclosure.

FIG. 4 is a view illustrating a disposition structure of a plurality of electric objects according to an embodiment of the disclosure.

An electronic device 100 illustrated in FIG. 4 may indicate an inner part of the electronic device 100 when viewed after removing a rear surface plate (e.g., a rear surface plate 111 of FIG. 2 or a rear surface plate 370 of FIG. 3). At least one of inner components of the electronic device 100 illustrated in FIG. 4 may be the same components as or the similar components with the components described through FIG. 1, 2, or 3 and redundant explanations with respect to the same or similar components will be omitted below.

Referring to FIG. 4, the electronic device 100 may be coupled to a display (e.g., the display 101 of FIG. 1 or the display 310 of FIG. 3) or may include an electric object 410 disposed adjacent to the display 101 or 310. In an embodiment, the electric object 410 may be disposed on the lower part (e.g., the lower part oriented in the −Z direction of FIG. 1, 2, or 3) of the display 101 or 310. Referring to the description related thereto, the display 101 or 310 may be disposed on one surface of the support member 322 disposed in the electronic device 100, and the electric object 410 may be disposed between the display 101 or 310 and one surface of the support member 322. In another embodiment, at least one of the at least one camera module (at least one of the camera modules 112, 113, 114, and 115), the flash 106, the support member 322, the electrical connection member 333, the second printed circuit board 332, and the first support structure 340 may be disposed on the lower part (e.g., the lower part oriented in the −Z direction of FIG. 1, 2, or 3) of the electric object 410. Alternatively, at least one of the first printed circuit board (e.g., the first printed circuit board 331 of FIG. 3), the second support structure (e.g., the second support structure 350 of FIG. 3), and the battery (e.g., the battery 360 of FIG. 3) may be further disposed on the lower part of the electric object 410.

In an embodiment, the electric object 410 may detect an input with respect to the display 101 or 310 (or, the screen display area of the display 101 or 310). In an example, the electric object 410 may include a digitizer capable of detecting an input by a digital pen (or, stylus pen) of a magnetic field scheme generated with respect to the display 101 or 310. However, the electric object 410 is not limited to the digitizer. In another example, the electric object 410 may include a plurality of wires extending in multiple directions, and may include components having various aspects capable of implementing an electromagnetic function based on the plurality of wires. In another embodiment, the electric object 410 may be expressed by being substituted with an object including an electromagnetic feature or function, a component, an element, or a part.

In yet another embodiment, the plurality of electric objects 410 may be separated, in order to secure a disposition area of the sensor (e.g., at least one of a sensor of an optical scheme, a sensor of an ultrasonic scheme, and a sensor of a capacitance scheme) disposable at the lower part (e.g., the lower part oriented in the −Z direction of FIG. 1, 2, or 3) of the display 101 or 310. For example, the electric object 410 may be separated into a first electric object 410*a* and a second electric object 410*b*. According to some embodiments, the electric object 410 may be configured to include the first electric object 410*a* and the second electric object 410*b* which are independently configured without the separation.

In one embodiment, the first electric object 410*a* may include an opening in order to accommodate the sensor disposed in a shape extending through one region of the first electric object 410*a*. The opening may be configured to have a size corresponding to the sensor on the first electric object 410*a*. In another embodiment, the first electric object 410*a* may be configured to have the same size as or the similar size with the display 101 or 310 (or the screen display area of the display 101 or 310) disposed on the upper part (e.g., the upper part oriented in the +Z direction of FIG. 1, 2, or 3).

According to some embodiments, an area having the opening configured on the first electric object 410*a* or an area where the first electric object 410*a* and the second electric object 410*b* are coupled are not limited to the illustrated embodiment. The area having the opening configured on the first electric object 410*a* or the area where the first electric object 410*a* and the second electric object 410*b* are coupled may be changed in various locations according to an area in which the sensor is disposed at the lower part of the display 101 or 310.

According to an embodiment, the second electric object 410*b* may be coupled to the first electric object 410*a* to overlap at least a portion of the opening at the lower part (e.g., the lower part oriented in the −Z direction of FIG. 1, 2, or 3) of the first electric object 410*a*. According to another embodiment, the second electric object 410*b* may have the same size (or shape) as the opening configured in the first electric object 410*a*, have the relatively large size, or have the relatively small size. In one example, in case that the second electric object 410*a* has the size different from that of the opening of the first electric object 410*a* (e.g., the large size or the small size), the second electric object 410*b* may have a size larger or smaller than that of the opening with respect to the first direction as illustrated, have a size larger or smaller than that of the opening with respect to the second direction, or have a size larger or smaller than that of the opening with respect to both the first direction and the second direction. Based on this, when the first electric object 410*a* and the second electric object 410*b* are coupled to each other, the second electric object 410*b* may not overlap the first electric object 410*a* or may overlap a part of the first electric object 410*a*.

Figure 5:
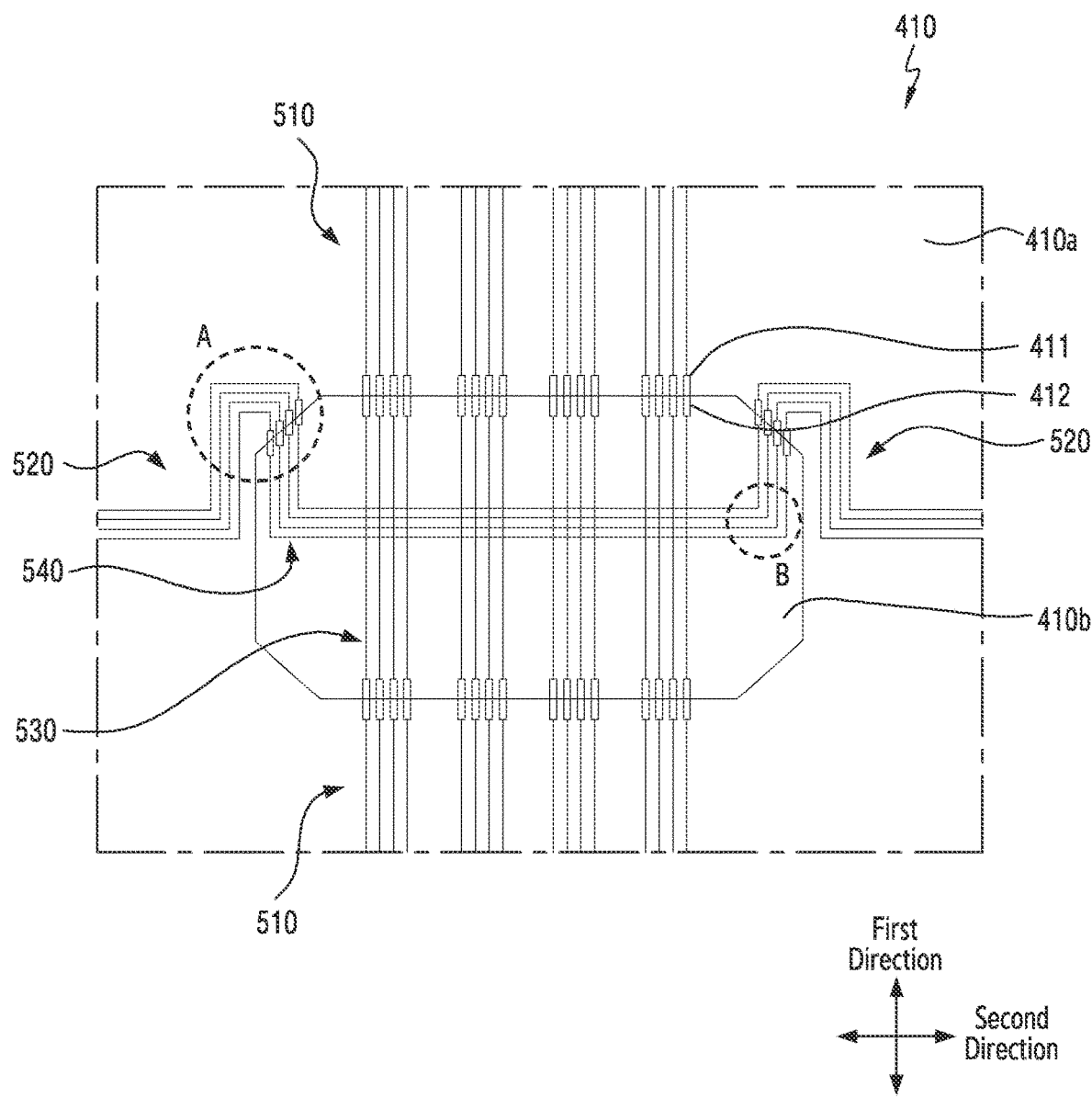
FIG. 5 is a view illustrating a wire connection structure between coupled multiple electric objects according to an embodiment of the disclosure.
Figure 6:
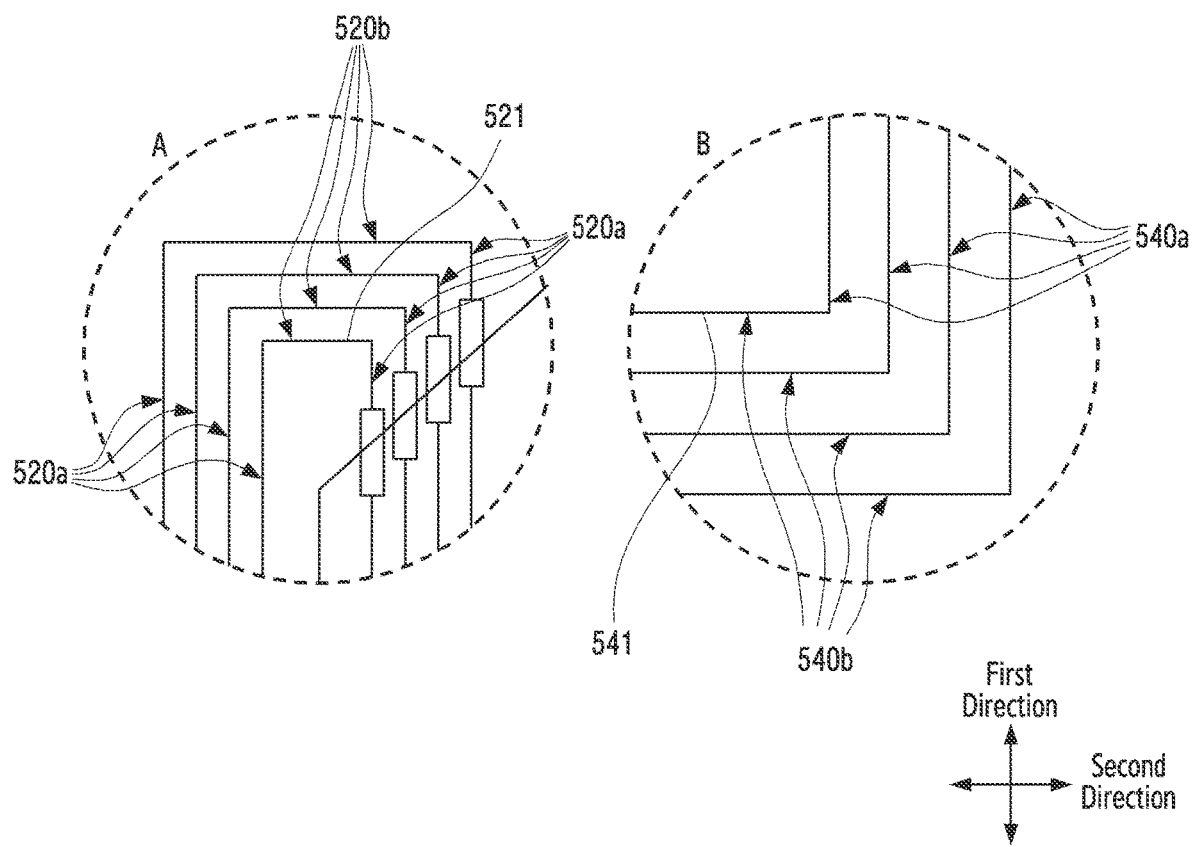
FIG. 6 is an enlarged view of a part of second wires of a first electric object and a part of fourth wires of a second electric object according to an embodiment of the disclosure.

FIG. 5 is a view illustrating a wire connection structure between coupled multiple electric objects according to an embodiment of the disclosure. FIG. 6 is an enlarged view of a part of second wires of a first electric object and a part of fourth wires of a second electric object according to an embodiment of the disclosure.

Referring to FIGS. 5 and 6, each of a first electric object 410*a* and a second electric object 410*b* configuring an electric object 410 may include a plurality of wires. In an example, the first electric object 410*a* may include first wires 510 and second wires 520, and the second electric object 410*b* may include third wires 530 and fourth wires 540. In an embodiment, the first electric object 410*a* may include at least one type of multiple wires among the first wires 510 and the second wires 520, and the plurality of the first wires 510 or the plurality of the second wires 520 may be arranged at a predetermined first interval to extend toward the same direction and to be parallel to each other. Similarly, the second electric object 410*b* may, for example, include at least one type of multiple wires among the third wires 530 and the fourth wires 540, and the plurality of the third wires 530 or the plurality of the fourth wires 540 may be arranged at the same interval as or the similar interval with the first interval to extend toward the same direction and to be parallel to each other.

In another embodiment, at least one type of wires among the first wires 510, the second wires 520, the third wires 530, and the fourth wires 540 may be understood as having a concept including one wire or a concept including a plurality of grouped wires. The first wires 510 may be configured as one wire, or arranged at the second interval narrower than the first interval to be configured as a plurality of wires which extend toward the same direction and are parallel to each other.

In one embodiment, the first wires 510 of the first electric object 410*a* may extend in the first direction, and some sections of at least one of the first wires 510 extending to a location corresponding to the opening on the first electric object 410*a* may be disconnected by the opening. In another embodiment, the second wires 520 of the first electric object 410*a* may include a first portion 520*a* extending in the first direction and a second portion 520*b* extending in a second direction substantially perpendicular to the first direction. In yet another embodiment, the direction switching between the first portion 520*a* extending in the first direction and the second portion 520*b* extending in the second direction may be implemented by perpendicular bending of the second wires 520. On the other hand, the direction switching between the first portion 520*a* extending in the first direction and the second portion 520*b* extending in the second direction may be implemented by bending of the second wires 520 to have a predetermined curvature or a predetermined inclination. In still another embodiment, the direction switching between the first portion 520*a* extending in the first direction and the second portion 520*b* extending in the second direction may be implemented by bending of the second wires 520 at least one time or more. At least one of the first portion 520*a* and the second portion 520*b* may include multiple portions disposed on the second wires 520 of the first electric object 410*a*. According to an embodiment, some sections of at least one of the second wires 520 extending to a location corresponding to the opening may be disconnected by the opening, on the first electric object 410a.

In an embodiment, in case that the second wires 520 of the first electric object 410a are configured as a plurality of grouped wires, the plurality of wires corresponding to the second portion 520b of the second wires 520 may have different lengths. In one example, with reference to one side wire (e.g., a wire 521) among the plurality of wires corresponding to the second portion 520b, as a wire is arranged toward the other side from one side wire (e.g., the wire 521), the wire may have a length extending as much as a predetermined length.

In another embodiment, the third wires 530 of the second electric object 410b may extend in the first direction without a disconnection of some sections. In yet another embodiment, the fourth wires 540 of the second electric object 410b may include a third portion 540a extending in the first direction and a fourth portion 540b extending in the second direction. According to some embodiments, the direction switching between the third portion 540a extending in the first direction and the fourth portion 540b extending in the second direction may be implemented by perpendicular bending of the fourth wires 540, by bending of the fourth wires 540 to have a predetermined curvature, or by bending of the fourth wires 540 to have a predetermined inclination. According to other embodiments, the direction switching between the third portion 540a extending in the first direction and the fourth portion 540b extending in the second direction may be implemented by bending of the fourth wires 540 at least one time or more. In yet another embodiment, at least one of the third portion 540a and the fourth portion 540b may include multiple portions disposed on the fourth wires 540 of the second electric object 410b, and the fourth wires 540 may extend from the second electric object 410b, without a disconnection of some sections.

In an embodiment, in case that the fourth wires 540 of the second electric object 410b are configured as a plurality of grouped wires, the plurality of wires corresponding to the fourth portion 540b of the fourth wires 540 may have different lengths. With reference to one side wire (e.g., a wire 541) among the plurality of wires corresponding to the fourth portion 540b, as a wire is arranged toward the other side from one side wire (e.g., the wire 541), the wire may have the length extending as much as the predetermined length.

According to some embodiments, each of the first electric object 410a and the second electric object 410b may include a plurality of layers. In an example, the first electric object 410a may include a first layer in which the first wires 510 are disposed and a second layer in which the second wires 520 are disposed and which is laminated on the first layer. Similarly, the second electric object 410b may include a third layer in which the third wires 530 are disposed and a fourth layer in which the fourth wires 540 are disposed and which is laminated on the third layer.

In one embodiment, when the first electric object 410a and the second electric object 410b are coupled to each other, the first wires 510 of the first electric object 410a and the third wires 530 of the second electric object 410b are electrically connected and extend in the first direction. Each of the first electric object 410a and the second electric object 410b may include at least one conductive pad. In an example, the first electric object 410a may include at least one first conductive pad 411 electrically connected to the first wires 510, at one portion (e.g., at least one of the edge upper end portion and lower end portion of the opening) corresponding to the first direction, among the edge portions of the opening. In another embodiment, the second electric object 410b may include at least one second conductive pad 412 electrically connected to the third wires 530, at one portion (e.g., at least one of the edge upper end portion and lower end portion of the second electric object 410b) corresponding to the first direction, among the edge portions of the second electric object 410b.

In yet another embodiment, at least one first conductive pad 411 and at least one second conductive pad 412 may support a coupling (e.g., soldering bond) between the first electric object 410a and the second electric object 410b, to electrically connect the first electric object 410a and the second electric object 410b. For example, the at least one first conductive pad 411 and the at least one second conductive pad 412 may be electrically and physically connected by a supplement (e.g., solder). The first wires 510 which are electrically connected to the at least one first conductive pad 411 and the third wires 530 which are electrically connected to the at least one second conductive pad 412 may be electrically connected to each other.

According to various embodiments, at least one first conductive pad 411 and at least one second conductive pad 412 may be configured in a square shape, a various polygonal shape, a circle, or an ellipse. According to other embodiments, a coupling between the first electric object 410a and the second electric object 410b is not limited to the soldering bond as exampled, and various coupling methods which may support electrical connection between the first electric object 410a and the second electric object 410b may be adopted. The at least one first conductive pad 411 and the at least one second conductive pad 412 may be omitted according to the various coupling methods, or may be substituted with a conductive via, a connector, or an anisotropic conductive film.

When the first electric object 410a and the second electric object 410b are coupled to each other, the second wires 520 of the first electric object 410a and the fourth wires 540 of the second electric object 410b may be electrically connected. On the first electric object 410a, the at least one first conductive pad 411 may be further included in one part among the corners of the opening (e.g., at least one of the upper corners of the opening) configured in the first electric object 410a to be electrically connected to the second wires 520. Similarly, on the second electric object 410b, the at least one second conductive pad 412 may be further included in one part among the corner parts of the second electric object 410b (e.g., at least one of the upper corners of the second electric object 410b) to be electrically connected to the fourth wires 540.

In one embodiment, the at least one first conductive pad 411 which is electrically connected to the second wires 520 and the at least one second conductive pad 412 which is electrically connected to the fourth wires 540 may be electrically and physically connected by a supplement (e.g., solder). The first portion 520a included in the second wires 520 of the first electric object 410a and the third portion 540a included in the fourth wires 540 of the second electric object 410b may be electrically connected and may extend in the first direction.

In some embodiments, an input signal with respect to the display (e.g., the display 101 of FIG. 1 and the display 310 of FIG. 3) detected based on at least one of the first portion 520a of the second wires 520, the second portion 520b of the second wires 520, and the third portion 540a of the fourth wires 540 may be corrected by software, and through this, distortion of the input signal according to the direction switching of the second wires 520 and the fourth wires 540 may be compensated.

Figure 7:
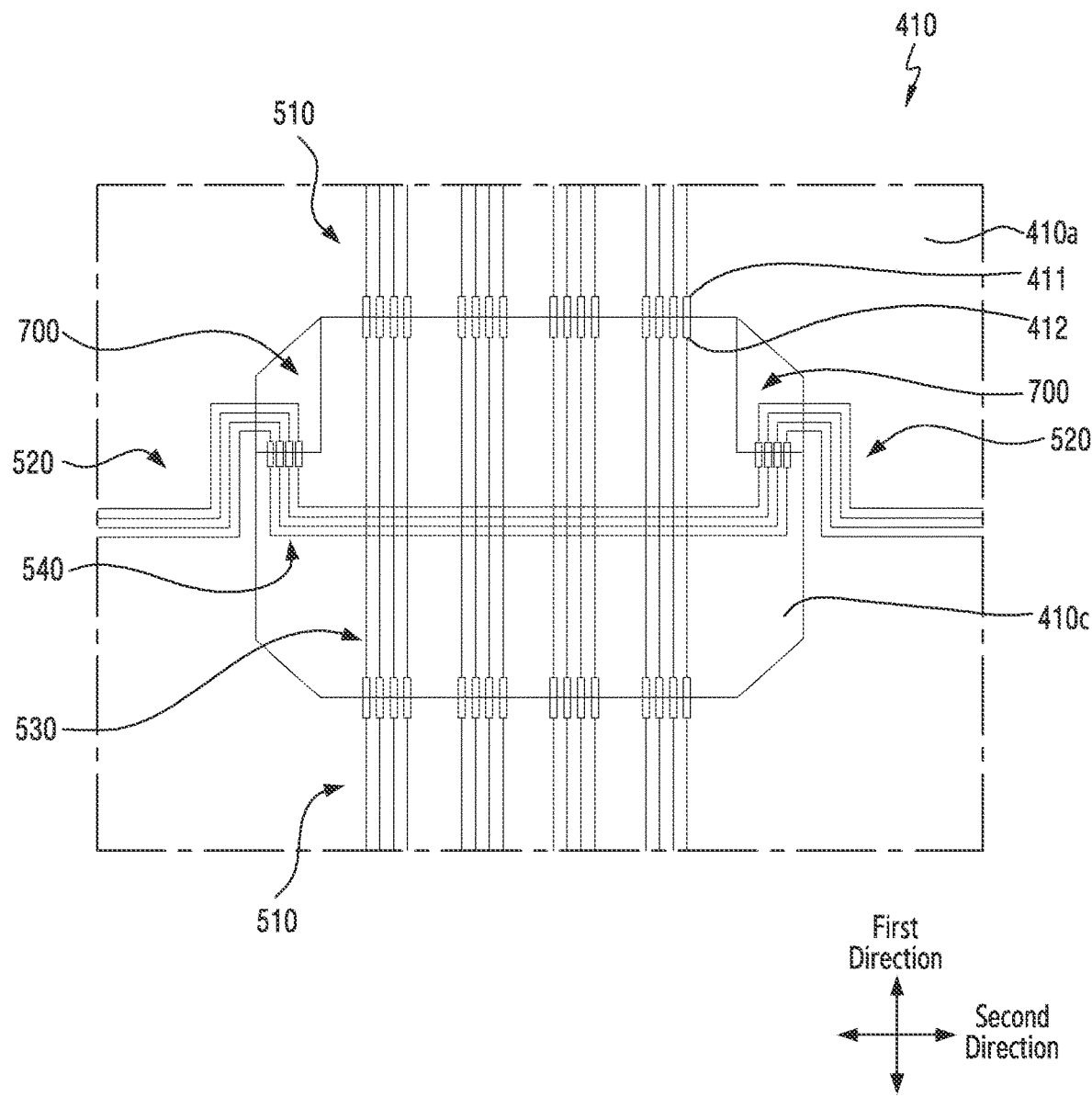
FIG. 7 is a view illustrating a wire connection structure between coupled multiple electric objects according to an embodiment of the disclosure.

FIG. 7 is a view illustrating a wire connection structure between coupled multiple electric objects according to an embodiment of the disclosure.

At least one of components of an electric object 410 illustrated in FIG. 7 may be the same components as or the similar components with components described through FIGS. 5 and 6 and redundant explanations with respect to the same or similar components will be omitted below.

Referring to FIG. 7, a second electric object 410c included in an electric object 410 may include various shapes. According to various embodiments, the second electric object 410c may include a shape (refer to FIG. 5) symmetrical with respect to the first direction and the second direction, and may include a shape (refer to FIG. 7) in which a partial area (i.e., one part) 700 is removed from the symmetrical shape. The second electric object 410c may include a shape in which one part 700 corresponding to an area where second wires 520 of a first electric object 410a and fourth wires 540 of the second electric object 410c are to be electrically connected, among edge portions of the second electric object 410c, is removed. According to an embodiment, the area where the second wires 520 and the fourth wires 540 are to be electrically connected may correspond to the corner area among the edge portions of the second electric object 410c. Based on this, the second electric object 410c may include a shape in which at least one corner area is removed from the shape symmetrical with respect to the first direction and the second direction. According to other embodiments, the second electric object 410c may include a shape in which one side corner area is removed, or a shape in which one side corner area and another side corner area symmetrical to the one side corner area in the first direction or the second direction are removed. According to yet other embodiments, one side corner area and another side corner area, which are removed, of the second electric object 410c may be removed by the same size or shape, or may be removed by different size or shape based on the wire (e.g., the third wires 530 and/or the fourth wires 540) structure of the second electric object 410c.

According to an embodiment, when the second electric object 410c having a shape in which the one part 700 is removed is coupled to the first electric object 410a, wire efficiency between the first electric object 410a and the second electric object 410c may be improved. For example, the first portion (e.g., the first portion 520a of FIG. 6) of the second wires 520 and the third portion (e.g., the third portion 540a of FIG. 6) of the fourth wires 540, which are to be connected at the one part 700, may be designed to have the wire length shortened as much as the length corresponding to the removed one part 700. When the second wires 520 and the fourth wires 540 are electrically connected, the wire loss and/or the space loss by a route may be reduced.

The second electric object 410c may be exampled as including the shape symmetrical with respect to the first direction and the second direction or the shape in which a partial area is removed from the symmetrical shape, but the second electric object 410c may include a shape of a circle, an ellipse, a regular polygon, or an irregular polygon. The shape of the second electric object 410c may be symmetric or may not be symmetric with respect to the first direction or the second direction.

Figure 8:
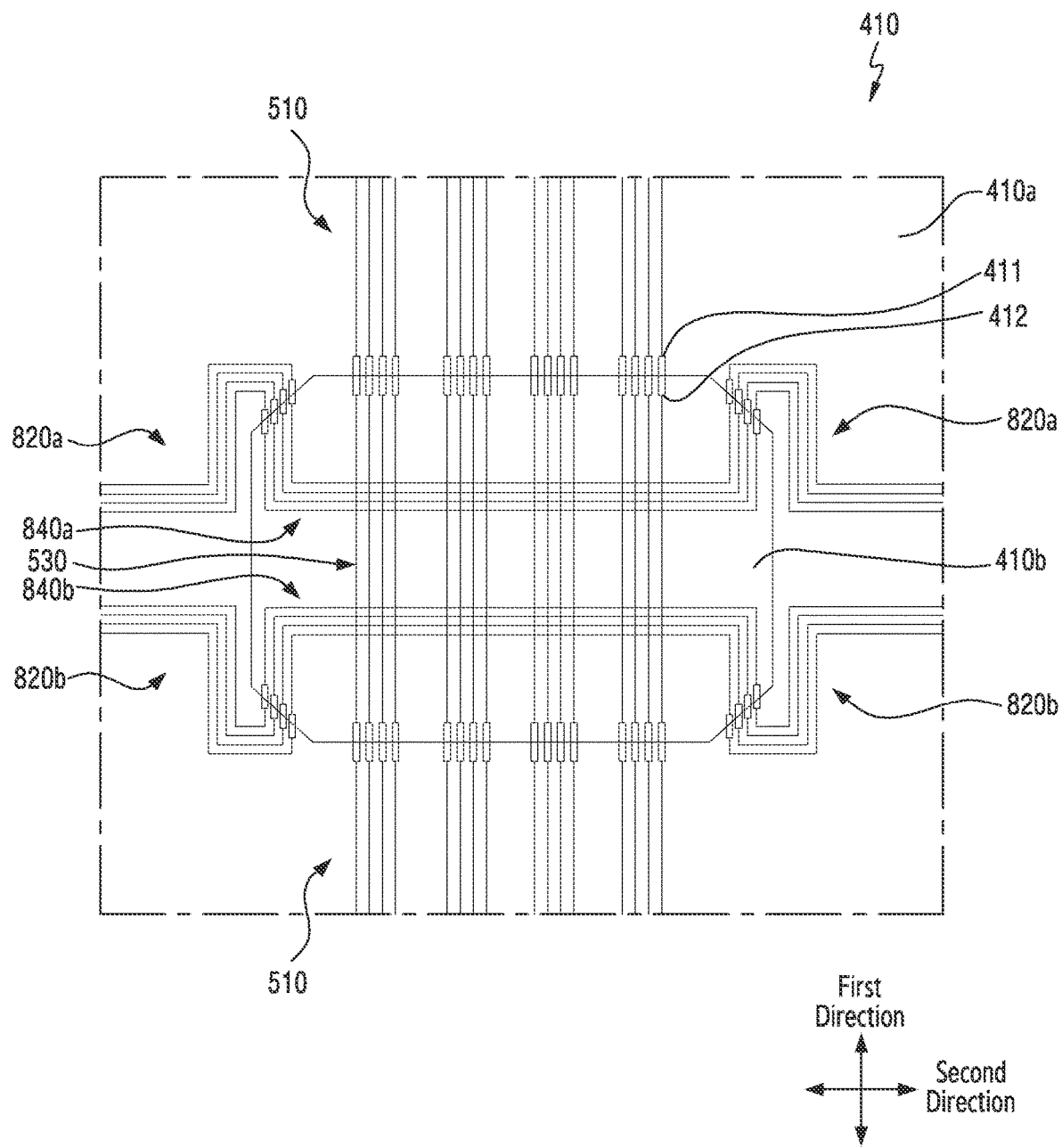
FIG. 8 is a view illustrating a wire connection structure between coupled multiple electric objects according to an embodiment of the disclosure.

FIG. 8 is a view illustrating a wire connection structure between coupled multiple electric objects according to an embodiment of the disclosure.

At least one of components of an electric object 410 illustrated in FIG. 8 may be the same components as or the similar components with the components described through FIGS. 5 and 6 and redundant explanations with respect to the same or similar components will be omitted below.

Referring to FIG. 8, a first electric object 410a may include second wires 820a including a plurality of first-grouped wires and second wires 820b including a plurality of the other second-grouped wires. In an example, at least one second wire extending to a location corresponding to the opening on the first electric object 410a may include the first-grouped second wires 820a and the second-grouped second wires 820b. Similarly, a second electric object 410b may include fourth wires 840a including a plurality of third-grouped wires and fourth wires 840a including a plurality of the other fourth-grouped wires.

According to one embodiment, the first-grouped second wires 820a and the second-grouped second wires 820b of the first electric object 410a may extend through routes symmetric with respect to the first direction. For example, the first-grouped second wires 820a may extend to one part (e.g., the upper end corner of the opening) among the corner parts of the opening configured in the first electric object 410a, and the second-grouped second wires 820b may extend to another part (e.g., the lower end corner of the opening) among the corner parts of the opening. According to another embodiment, the third-grouped fourth wires 840a and the fourth-grouped fourth wires 840b of the second electric object 410b may extend through routes symmetric with respect to the first direction. The third-grouped fourth wires 840a may extend to one part (e.g., the upper end corner of the second electric object 410b) among the corner parts of the second electric object 410b, and the fourth-grouped fourth wires 840b may extend to another part (e.g., the lower end corner of the second electric object 410b) among the corner parts of the second electric object 410b.

In an embodiment, the first-grouped second wires 820a extending to one part among the corner parts of the opening and the third-grouped fourth wires 840a extending to one part among the corner parts of the second electric object 410b may be electrically connected. In another embodiment, the second-grouped second wires 820b extending to another part among the corner parts of the opening and the fourth-grouped fourth wires 840b extending to another part among the corner parts of the second electric object 410b may be electrically connected.

According to various embodiments, at least one second wire extending to a location corresponding to the opening on the first electric object 410a may further include fifth-grouped second wires in addition to the first-grouped second wires 820a and the second-grouped second wires 820b. Additionally, the second electric object 410b may further include sixth-grouped fourth wires in addition to the third-grouped fourth wires 840a and the fourth-grouped fourth wires 840b. Electrical connection between the fifth-grouped second wires and the sixth-grouped fourth wires may, for example, be implemented at the opening upper end of the first electric object 410a and the upper end portion of the second electric object 410b or may be implemented at the opening lower end of the first electric object 410a and the lower end portion of the second electric object 410b.

Figure 9:
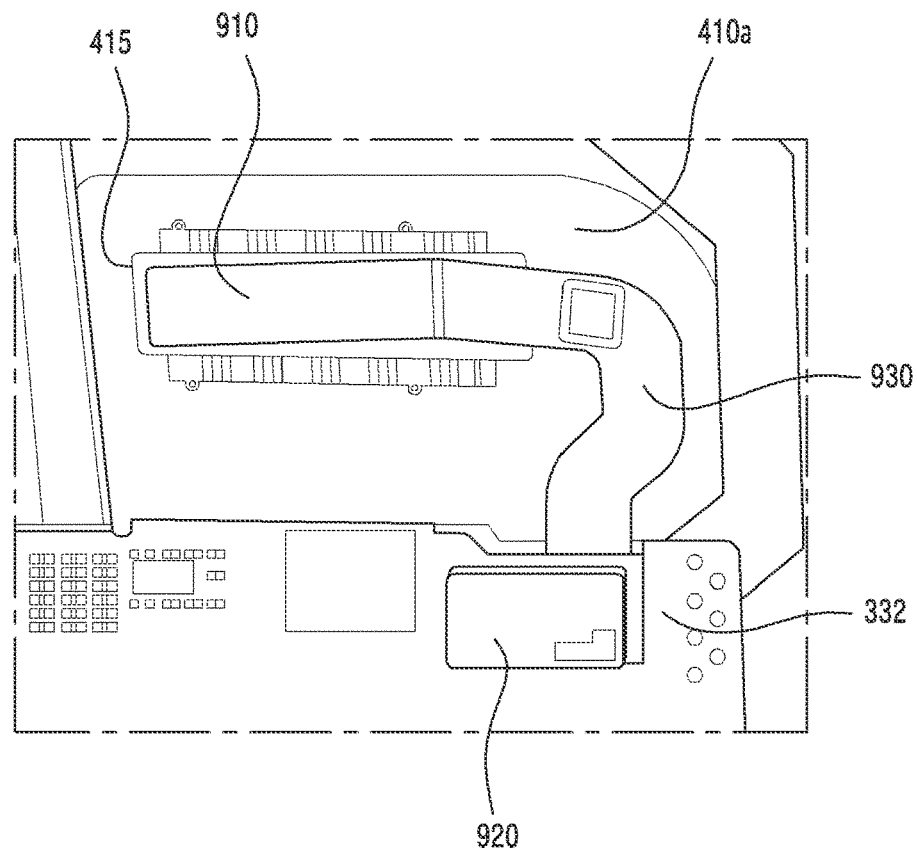
FIG. 9 is a view illustrating a disposition structure of a sensor according to an embodiment of the disclosure.
Figure 9:
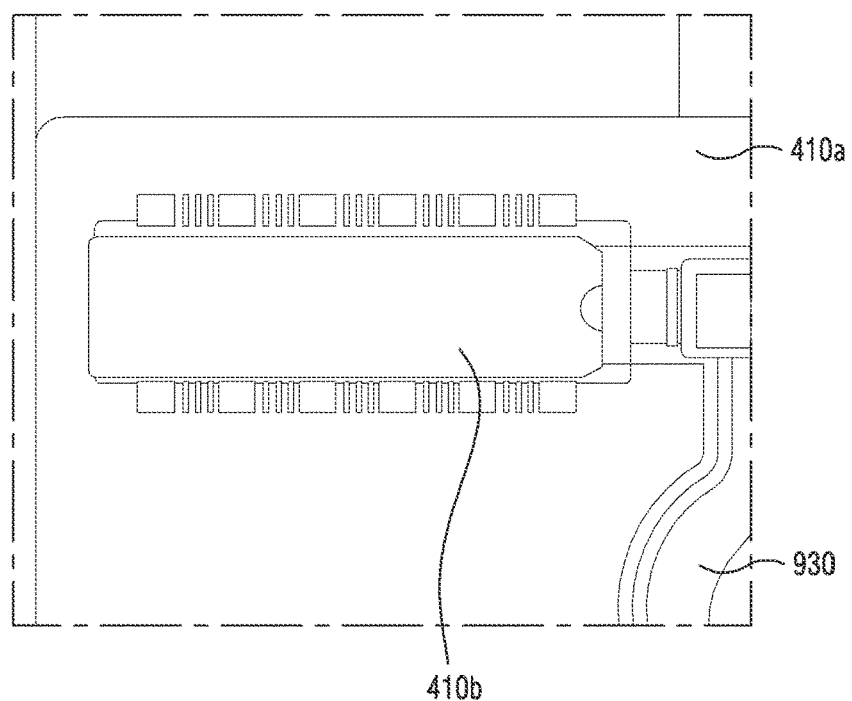

FIG. 9 is a view illustrating a disposition structure of a sensor according to an embodiment of the disclosure.

Referring to FIG. 9, at least one sensor 910 (e.g., at least one of a sensor of an optical scheme, a sensor of an ultrasonic scheme, and a sensor of a capacitance scheme) may be disposed at the lower part (e.g., the lower part oriented in the −Z direction of FIG. 1, 2, or 3) of the display (e.g., a display 101 of FIG. 1 or a display 310 of FIG. 3). In this regard, a first electric object 410a disposed at a lower part of the display 101 or 310 may include an opening 415 for accommodating at least a part of the sensor 910. In an example, the first electric object 410a may include the opening 415 at the location corresponding to the disposition area of the sensor 910 and at least a part of the sensor 910 may be disposed to be accommodated in the opening 415.

According to one embodiment, at least a part of the sensor 910 may extend along (or, adjacent to the rear surface of the first electric object 410a) the rear surface (e.g., the rear surface oriented in the −Z direction of FIG. 1, 2, or 3) of the first electric object 410a in a state in which the sensor 910 is disposed to correspond to the opening 415 of the first electric object 410a. The sensor 910 may include a flexible printed circuit board 930 for electrically connecting the sensor 910 and a processor 920 (e.g., a processor 1020 of FIG. 10) disposed on the second printed circuit board 332. According to another embodiment, the flexible printed circuit board 930 may extend and be exposed along the rear surface of the first electric object 410a from the opening 415 of the first electric object 410a.

According to yet another embodiment, the second electric object 410b may be coupled to the first electric object 410a, so as to overlap (or, to shield at least a part of the sensor 910 accommodated in the opening 415 of the first electric object 410a) at least a portion of the opening 415 of the first electric object 410a. According to still another embodiment, when the first electric object 410a and the second electric object 410b are coupled to each other, one surface (e.g., one surface oriented in the −Z direction of FIG. 1, 2, or 3) of the first electric object 410a and one surface (e.g., one surface oriented in the −Z direction of FIG. 1, 2, or 3) of the second electric object 410b may configure substantially the same plane or may configure a stepped portion, according to a size of the sensor 910 disposed to correspond to the opening 415 of the first electric object 410a.

Figure 10:
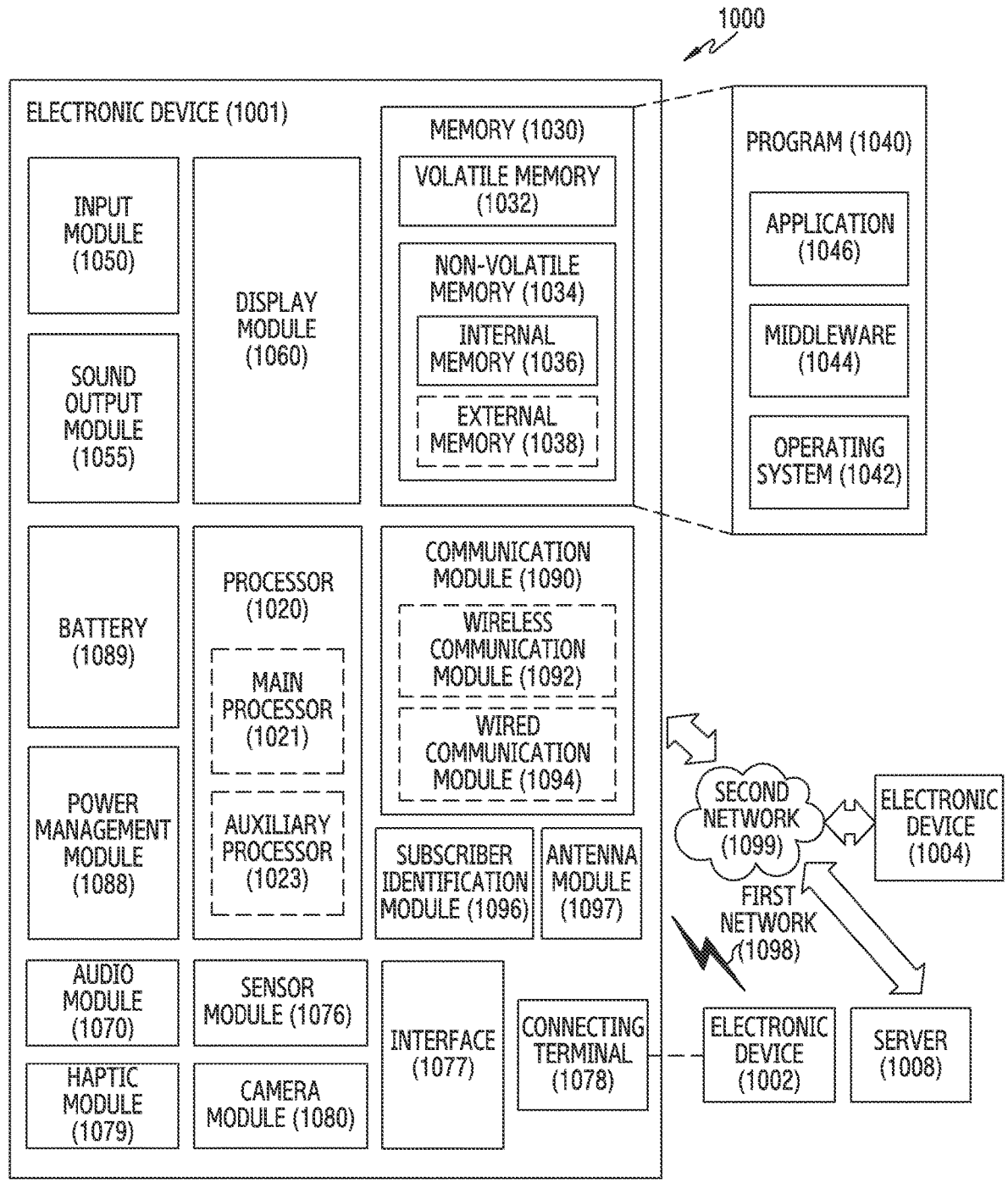
FIG. 10 is a view illustrating an electronic device within a network environment according to an embodiment of the disclosure.

FIG. 10 is a view illustrating an electronic device within a network environment according to an embodiment of the disclosure.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to one embodiment, the electronic device 1001 may communicate with the electronic device 1004 via the server 1008. According to another embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In other embodiments, some of the components (e.g., the sensor module 1076, the camera module 1080, or the antenna module 1097) may be implemented as a single component (e.g., the display module 1060).

The processor 1020 may be configured to execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to another embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. When the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to another embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, reinforcement learning, and the like. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may be configured to store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), a digital pen (e.g., a stylus pen), and the like.

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may be configured to visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to one embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. In an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. In an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to another embodiment, the connecting terminal 1078 may include, for example, a HDMI connector, a USB connector, an SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to one embodiment, the haptic module 1079 may include, for example, a motor, a piezoelectric element, or an electric stimulator.

The camera module 1080 may capture a still image or moving images. According to another embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to another embodiment, the battery 1089 may include, for example, a primary cell which is not rechargeable, a secondary cell which is rechargeable, or a fuel cell.

The communication module 1090 may be configured to support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to another embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the millimeter wave (mmWave) band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to one embodiment, the antenna module 1097 may include an antenna including a radiating element composed of a conductive material or a conductive pattern formed in or on a substrate (e.g., a printed circuit board (PCB)). According to another embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to yet another embodiment, another component (e.g., a radio frequency integrated circuit (RFIC)) other than the radiating element may be additionally formed as part of the antenna module 1097.

According to various embodiments, the antenna module 1097 may form a mmWave antenna module. In an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to another embodiment, all or some of operations to be executed at the electronic device 1001 may be executed at one or more of the external electronic devices 1002, 1004, or 1008. In an example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. According to another embodiment, the electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

Figure 11:
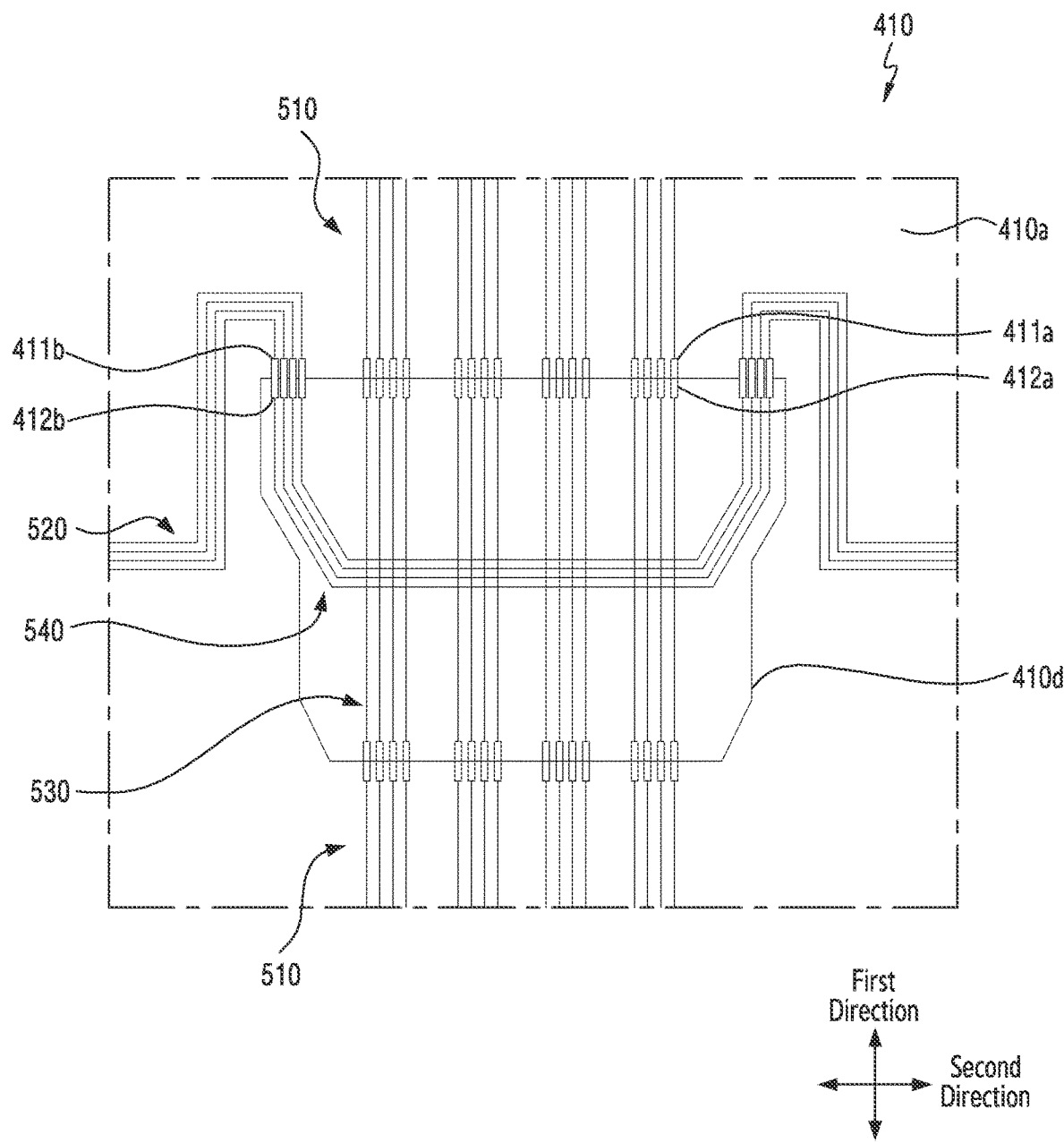
FIG. 11 is a view illustrating a wire connection structure between coupled multiple electric objects according to an embodiment of the disclosure.

FIG. 11 is a view illustrating a wire connection structure between coupled multiple electric objects according to an embodiment of the disclosure.

At least one of components of an electric object 410 illustrated in FIG. 11 may be the same components as or the similar components with the components explained through FIGS. 5 and 6 and redundant explanations with respect to the same or similar components will be omitted below.

Referring to the above description corresponding to FIGS. 5 and 6, the first electric object (e.g., a first electric object 410a of FIG. 5) may include at least one first conductive pad (e.g., a first conductive pad 411 of FIG. 5) electrically connected to a first wire (e.g., first wires 510 of FIG. 5) in one portion (e.g., at least one of the edge upper end portion and lower end portion of the opening) corresponding to the first direction, among the edge portions of the opening. The second electric object (e.g., a second electric object 410b of FIG. 5) may include at least one second conductive pad (e.g., a second conductive pad 412 of FIG. 5) electrically connected to a third wire (e.g., third wires 530 of FIG. 5) in one portion (e.g., at least one of the edge upper end portion and lower end portion of the second electric object 410b) corresponding to the first direction, among the edge portions of the second electric object 410b. In one embodiment, at least one first conductive pad 411 and at least one second conductive pad 412 may support electrical connection between the first wires 510 of the first electric object 410a and the third wires 530 of the second electric object 410b.

Referring to FIG. 11, the first electric object 410a may include at least one first conductive pad 411b which is electrically connected to the second wires 520, and at least one first conductive pad 411b may be disposed on the same line as or the similar line with at least one first conductive pad 411a which is electrically connected to the first wires 510. In an embodiment, the second electric object 410d may include at least one second conductive pad 412b which is electrically connected to the fourth wires 540 and the at least one second conductive pad 412b may be disposed on the same line as or the similar line with at least one second conductive pad 412a which is electrically connected to the third wires 530. In another embodiment, the at least one first conductive pad 411b which is electrically connected to the second wires 520 and the at least one second conductive pad 412b which is electrically connected to the fourth wires 540 may support electrical connection between the second wires 520 and the fourth wires 540. Based on this, the electrical connection area between the second wires 520 of the first electric object 410*a* and the fourth wires 540 of the second electric object 410*d* may exist on the same line as or the similar line with, or be parallel to an electrical connection area between the first wires 510 of the first electric object 410*a* and the third wires 530 of the second electric object 410*d*.

In some embodiments, the fourth wires 540 of the second electric object 410*d* may perform a direction switching (e.g., vertical direction changing) once, in order to arrive in the at least one second conductive pad 412*b* for electrical connection. On the other hand, the fourth wires 540 of the second electric object 410*d* may, for example, perform a direction switching (e.g., bending to have a predetermined inclination or bending to have a predetermined curvature) at least two times or more, to extend along and to correspond to a shape of the second electric object 410*d* in order to arrive in the at least one second conductive pad 412*b*.

An electronic device according to the embodiments described above may include a first electric object including a first wire extending in a first direction, a second wire including a first portion extending in the first direction and a second portion extending in a second direction different from the first direction, and an opening in one region and a second electric object including a third wire extending in the first direction and a fourth wire including a third portion extending in the first direction and a fourth portion extending in the second direction, the second electric object being coupled to the first electric object so as to close at least a portion of the opening.

According to other embodiments, the first wire of the first electric object and the third wire of the second electric object are electrically connected and extend in the first direction, and the first portion of the second wire of the first electric object and the third portion of the fourth wire of the second electric object are electrically connected and extend in the first direction.

According to some embodiments, the second wire of the first electric object may include a plurality of second wires arranged at a first interval, and at least one wire extending to a location corresponding to the opening, among the second wires, comprises a disconnected section.

According to other embodiments, the second wire of the first electric object may include a plurality of the first portions and the second portions.

According to yet other embodiments, the second wire of the first electric object may include a plurality of wires arranged at a second interval, and the plurality of wires corresponding to the second portions of the second wire may have different lengths.

The fourth wire of the second electric object may include a plurality of wires arranged at a second interval, and the plurality of wires corresponding to the fourth portions of the fourth wire may have different lengths.

In an embodiment, the first electric object may include at least one first conductive pad electrically connected to the first portion of the second wire at one portion corresponding to the first direction, among edge portions of the opening, and the second electric object may include at least one second conductive pad electrically connected to the third portion of the fourth wire at one portion corresponding to the first direction, among edge portions of the second electric object.

In another embodiment, the first portion of the second wire of the first electric object and the third portion of the fourth wire of the second electric object may be electrically connected by electrical connection of at least one first conductive pad and at least one second conductive pad.

In yet another embodiment, the second electric object may include a shape in which at least one corner area is removed.

In still another embodiment, the first portion of the second wire of the first electric object and the third portion of the fourth wire of the second electric object may be electrically connected at the portion where the at least one corner area is removed.

The second wire of the first electric object may include a plurality of first-grouped second wires and a plurality of second-grouped second wires, the first-grouped second wires may extend to an upper end portion of the opening corresponding to the first direction, among the edge portions of the opening, and the second-grouped second wires may extend to a lower end portion of the opening corresponding to the first direction, among the edge portions of the opening.

According to some embodiments, the fourth wire of the second electric object may include a plurality of third-grouped fourth wires and a plurality of fourth-grouped fourth wires, the third-grouped fourth wires may extend to an upper end portion of the second electric object corresponding to the first direction, among the edge portions of the second electric object, and the fourth-grouped fourth wires may extend to an lower end portion of the second electric object corresponding to the first direction, among the edge portions of the second electric object.

According to other embodiments, the first-grouped second wires of the first electric object and the third-grouped fourth wires of the second electric object may be electrically connected, and the second-grouped second wires of the first electric object and the fourth-grouped fourth wires of the second electric object may be electrically connected.

In an embodiment, the electronic device may further include a display.

In another embodiment, the first electric object may have a size corresponding to the display.

In still another embodiment, the second electric object may be coupled to the first electric object, not to overlap the first electric object or to overlap a part of the first electric object.

In yet another embodiment, the electronic device may further include the sensor, at least a part of which is disposed to be accommodated in the opening of the first electric object.

At the time of coupling the first electric object and the second electric object, one surface of the first electric object and one surface of the second electric object oriented in the same direction as the one surface of the first electric object may configure the same plane or configure a stepped portion.

According to some embodiments described above, the electronic device may include a display, a first digitizer disposed at the lower part of the display and including an opening in one area, a sensor disposed inside the opening at the lower part of the display, and a second digitizer coupled to the first digitizer so as to close at least a portion of the opening at the lower part of the display.

According to other embodiments, the first digitizer may include a first wire extending in a first direction and a second wire including a first portion extending in the first direction and a second portion extending in a second direction different from the first direction, the second digitizer may include a third wire extending in the first direction and a fourth wire including a third portion extending in the first direction and the fourth portion extending in the second direction, the first wire of the first digitizer and the third wire of the second digitizer are electrically connected and extend in the first direction, and the first portion of the second wire of the first digitizer and the third portion of the fourth wire of the second digitizer are electrically connected and extend in the first direction.

According to an embodiment, the second wire of the first digitizer may include a plurality of wires arranged at a predetermined interval and the plurality of wires corresponding to the second portions of the second wire may have different lengths.

According to another embodiment, the fourth wire of the second digitizer may include a plurality of wires arranged at a predetermined interval and the plurality of wires corresponding to the fourth portions of the fourth wire may have different lengths.

According to yet another embodiment, the second digitizer may have a shape in which at least one corner area is removed, and the first portion of the second wire of the first digitizer and the third portion of the fourth wire of the second digitizer may be electrically connected at the portion where the at least one corner area is removed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to another embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). In an example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. In an embodiment, the machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to yet other embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a first electric object comprising:
       a first wire extending in a first direction;
       a second wire comprising:
          a first portion extending in the first direction; and
          a second portion extending in a second direction different from the first direction; and
       an opening in one region; and
    a second electric object comprising:
       a third wire extending in the first direction; and a fourth wire comprising:
  a third portion extending in the first direction; and
  a fourth portion extending in the second direction,
wherein the second electric object is coupled to the first electric object so as to close at least a portion of the opening,
wherein the first wire of the first electric object and the third wire of the second electric object are electrically connected and extend in the first direction, and
wherein the first portion of the second wire of the first electric object and the third portion of the fourth wire of the second electric object are electrically connected and extend in the first direction.

2. The electronic device of claim 1,
wherein the second wire of the first electric object comprises a plurality of second wires arranged at a first interval, and
wherein at least one wire extending to a location corresponding to the opening, among the second wires, comprises a disconnected section.

3. The electronic device of claim 1, wherein the second wire of the first electric object comprises a plurality of first portions and a plurality of second portions.

4. The electronic device of claim 1,
wherein the second wire of the first electric object comprises a plurality of wires arranged at a second interval, and
wherein the plurality of wires corresponding to the second portions of the second wire have different lengths.

5. The electronic device of claim 1,
wherein the fourth wire of the second electric object comprises a plurality of wires arranged at a second interval, and
wherein the plurality of wires corresponding to the fourth portions of the fourth wire have different lengths.

6. The electronic device of claim 1,
wherein the first electric object comprises at least one first conductive pad electrically connected to the first portion of the second wire at one portion corresponding to the first direction, among edge portions of the opening, and
wherein the second electric object comprises at least one second conductive pad electrically connected to the third portion of the fourth wire at one portion corresponding to the first direction, among edge portions of the second electric object.

7. The electronic device of claim 6, wherein the first portion of the second wire of the first electric object and the third portion of the fourth wire of the second electric object are electrically connected by electrical connection of at least one first conductive pad and at least one second conductive pad.

8. The electronic device of claim 1,
wherein the second electric object comprises a shape in which at least one corner area is removed, and
wherein the first portion of the second wire of the first electric object and the third portion of the fourth wire of the second electric object are electrically connected at the portion where the at least one corner area is removed.

9. The electronic device of claim 1,
wherein the second wire of the first electric object comprises a plurality of first-grouped second wires and a plurality of second-grouped second wires,
wherein the first-grouped second wires extend to an upper end portion of the opening corresponding to the first direction, among edge portions of the opening, and
wherein the second-grouped second wires extend to a lower end portion of the opening corresponding to the first direction, among the edge portions of the opening.

10. The electronic device of claim 9,
wherein the fourth wire of the second electric object comprises a plurality of third-grouped fourth wires and a plurality of fourth-grouped fourth wires,
wherein the third-grouped fourth wires extend to an upper end portion of the second electric object corresponding to the first direction, among the edge portions of the second electric object, and
wherein the fourth-grouped fourth wires extend to a lower end portion of the second electric object corresponding the first direction, among the edge portions of the second electric object.

11. The electronic device of claim 10,
wherein the first-grouped second wires of the first electric object and the third-grouped fourth wires of the second electric object are electrically connected, and
wherein the second-grouped second wires of the first electric object and the fourth-grouped fourth wires of the second electric object are electrically connected.

12. The electronic device of claim 1, further comprising:
a display,
wherein the first electric object has a size corresponding to the display.

13. The electronic device of claim 1, wherein the second electric object is coupled to the first electric object, not to overlap the first electric object or to overlap a part of the first electric object.

14. The electronic device of claim 1, further comprising:
a sensor, at least a part of which is disposed to be accommodated in the opening of the first electric object.

15. The electronic device of claim 1, wherein at the time of coupling the first electric object and the second electric object, one surface of the first electric object and one surface of the second electric object, oriented in the same direction as the one surface of the first electric object, configure the same plane or configure a stepped portion.

16. An electronic device comprising:
a display;
a first digitizer disposed at a lower part of the display and including an opening in one area;
a sensor disposed inside the opening at the lower part of the display; and
a second digitizer coupled to the first digitizer so as to close at least a portion of the opening at the lower part of the display,
wherein the first digitizer comprising:
  a first wire extending in a first direction; and
  a second wire comprising:
    a first portion extending in the first direction; and
    a second portion extending in a second direction different from the first direction,
wherein the second digitizer comprising:
  a third wire extending in the first direction; and
  a fourth wire comprising:
    a third portion extending in the first direction; and
    a fourth portion extending in the second direction,
wherein the first wire of the first digitizer and the third wire of the second digitizer are electrically connected and extend in the first direction, and
wherein the first portion of the second wire of the first digitizer and the third portion of the fourth wire of the second digitizer are electrically connected and extend in the first direction.

17. The electronic device of claim 16,
wherein the second wire of the first digitizer comprises a plurality of wires arranged at a predetermined interval, and
wherein the plurality of wires corresponding to the second portions of the second wire have different lengths.

18. The electronic device of claim 16,
wherein the fourth wire of the second digitizer comprises a plurality of wires arranged at a predetermined interval, and
wherein the plurality of wires corresponding to the fourth portions of the fourth wire have different lengths.

19. The electronic device of claim 16,
wherein the second digitizer comprises a shape in which at least one corner area is removed, and
wherein the first portion of the second wire of the first digitizer and the third portion of the fourth wire of the second digitizer are electrically connected at the portion where the at least one corner area is removed.

* * * * *